United States Patent
Ziv et al.

(10) Patent No.: US 9,015,194 B2
(45) Date of Patent: Apr. 21, 2015

(54) ROOT CAUSE ANALYSIS USING INTERACTIVE DATA CATEGORIZATION

(75) Inventors: Dror Daniel Ziv, Huntington, NY (US); Yaron Gvili, Kfar Saba (IL); Alexander Sokolovsky, Tel Aviv (IL); Ofer Shochet, Tel Aviv (IL); Michael Brand, Clayton South (AU)

(73) Assignee: Verint Systems Inc., Santa Clara, CA (US)

( * ) Notice: Subject to any disclaimer, the term of this patent is extended or adjusted under 35 U.S.C. 154(b) by 672 days.

(21) Appl. No.: 11/824,980

(22) Filed: Jul. 2, 2007

(65) Prior Publication Data

US 2009/0012970 A1    Jan. 8, 2009

(51) Int. Cl.
*G06F 7/00* (2006.01)
*G06F 17/30* (2006.01)

(52) U.S. Cl.
CPC .................. *G06F 17/30705* (2013.01)

(58) Field of Classification Search
None
See application file for complete search history.

(56) References Cited

U.S. PATENT DOCUMENTS

| | | | | |
|---|---|---|---|---|
| 6,009,439 | A * | 12/1999 | Shiomi et al. | 707/104.1 |
| 6,895,084 | B1 * | 5/2005 | Saylor et al. | 379/88.22 |
| 7,389,230 | B1 * | 6/2008 | Nelken | 704/255 |
| 2004/0093302 | A1 * | 5/2004 | Baker et al. | 705/37 |
| 2004/0163035 | A1 * | 8/2004 | Ariel et al. | 715/500 |
| 2004/0181554 | A1 * | 9/2004 | Heckerman et al. | 707/104.1 |
| 2004/0249794 | A1 * | 12/2004 | Nelson et al. | 707/3 |
| 2005/0102189 | A1 * | 5/2005 | Lopez et al. | 705/26 |
| 2006/0048186 | A1 * | 3/2006 | Alterman | 725/45 |
| 2006/0167771 | A1 * | 7/2006 | Meldahl | 705/30 |
| 2007/0010990 | A1 * | 1/2007 | Woo | 704/4 |
| 2007/0156392 | A1 * | 7/2007 | Balchandran et al. | 704/9 |
| 2007/0250315 | A1 * | 10/2007 | Bennett et al. | 704/235 |
| 2008/0071544 | A1 * | 3/2008 | Beaufays et al. | 704/270.1 |
| 2008/0240102 | A1 * | 10/2008 | Rajsic et al. | 370/392 |

OTHER PUBLICATIONS

"Contact Center Solutions", excerpt from the Verint internet site located at http://verint.com/contact_center/index.cfm, retrieved on Jun. 18, 2008, 4 pages.
"The Power of Why—Using Root Cause Analytics to Drive Superior Performance", A Verint Systems Executive Brief, Jan. 2007, 18 pages.

(Continued)

*Primary Examiner* — Apu Mofiz
*Assistant Examiner* — Thu Nga Nguyen
(74) *Attorney, Agent, or Firm* — Meunier Carlin & Curfman

(57) ABSTRACT

A computer-implemented method for processing a plurality of data items includes defining a set of one or more categories having a corresponding set of conditions that associate the data items with the categories. A sub-categorization request, requesting to divide a category from among the categories into lower-level categories, is accepted from a user. The data items associated with the category are processed responsively to the sub-categorization request, so as to automatically suggest the lower-level categories.
The automatically-suggested lower-level categories are presented to the user, and direction with respect to the automatically-suggested lower-level categories is accepted from the user. A hierarchical structure representing the categories is constructed responsively to the direction, by dividing the category into the lower-level categories. Output based on the hierarchical structure is presented to the user.

20 Claims, 4 Drawing Sheets

(56) References Cited

OTHER PUBLICATIONS

Goldszmidt, Moises et al., "A Probabilistic Approach to Full-Text Document Clustering", SRI International Technical Report ITAD-433-MS-98-044, 1998, 19 pages.

"Communications Interception & Analytics Solutions", excerpt from Verint internet site located at http://verint.com/communications%5Finterception/, retrieved on Jun. 18, 2007, 3 pages.

Slonim, Noam et al., "Document Clustering using Word Clusters via the Information Bottleneck Method", proceedings of the 23rd Annual International ACM SIGIR Conference on Research and Development in Information Retrieval (SIGR '00), Athens, Greece, Jul. 24-28, 2000, pp. 208-215.

Pantel, Patrick et al., "Document Clustering with Committees", Proceedings of the 25th Annual International ACM SIGIR Conference on Research and development in Information Retrieval (SIGIR '02), Tampere, Finland, Aug. 11-15, 2002, pp. 199-206.

Dhillon, Inderjit S., "Co-Clustering documents and words using Bipartite Spectral Graph Partitioning", Proceeding of the 7th ACM SIGKDD International Conference on Knowledge Discovery and Data Mining (KDD 2001), San Francisco, CA, Aug. 26-29, 2001, pp. 269-274.

Verint Systems Inc., "The ULTRA Analytics Suite", 2005, 3 pages.

\* cited by examiner

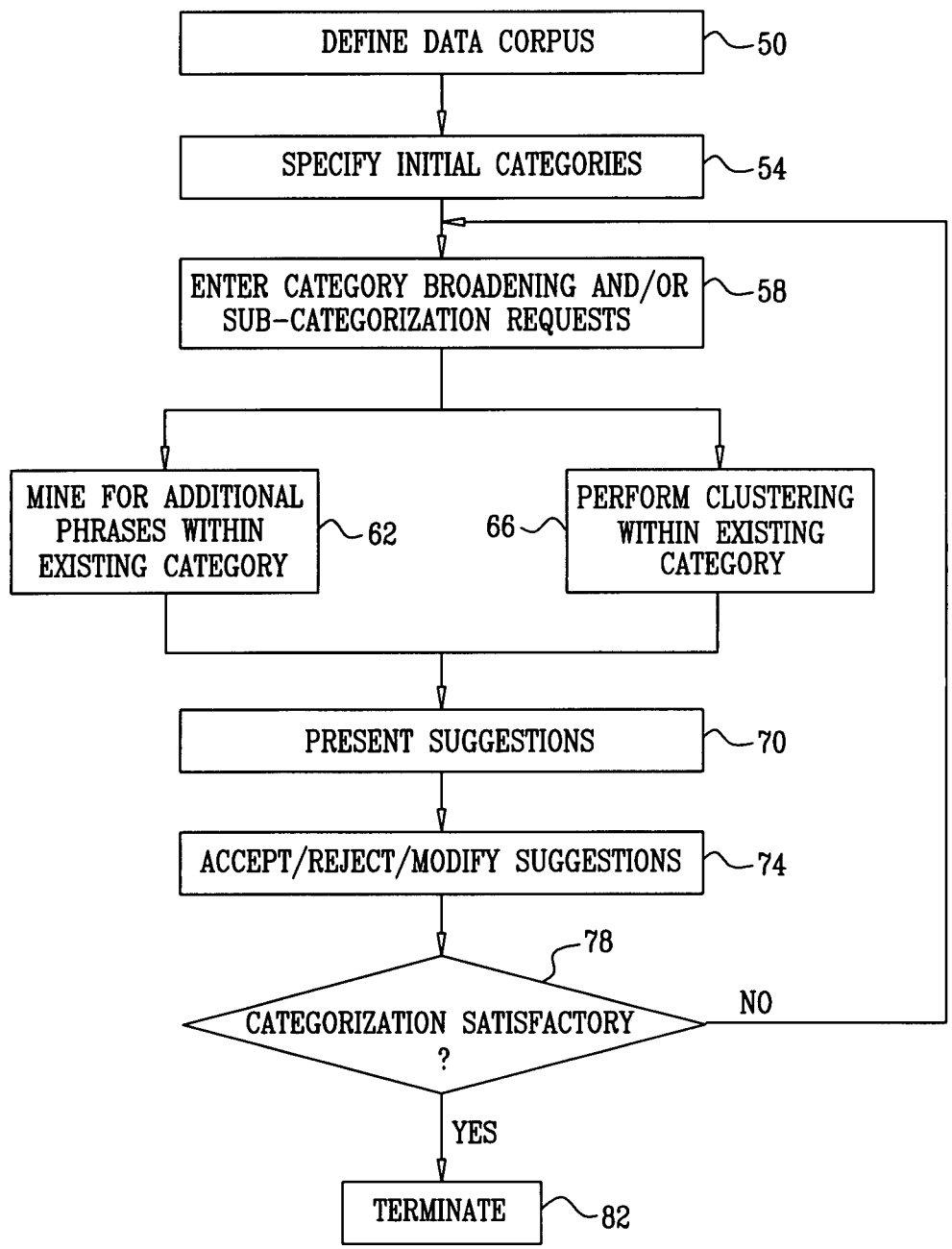

US 9,015,194 B2

ROOT CAUSE ANALYSIS USING INTERACTIVE DATA CATEGORIZATION

FIELD OF THE INVENTION

The present invention relates generally to data processing systems, and particularly to methods and systems for data categorization.

BACKGROUND OF THE INVENTION

Many types of data processing systems process large bodies of stored data items. For example, contact centers (call centers) store and process large volumes of customer interaction sessions. An exemplary call recording and processing system called ULTRA is produced by Verint® Systems Inc. (Melville, N.Y.). The ULTRA system suite includes a component called Intellifind, which performs speech analytics in response to user queries. Further details regarding the ULTRA and Intellifind products can be found at www.verint-.com/contact_center/index.cfm.

The processing of recorded customer sessions sometimes involves classifying the sessions into categories. In some applications, recorded calls made by customers are categorized in order to determine the reasons ("root causes") that caused the calls. Exemplary root cause categorization methods, which are carried out by the ULTRA system, are described in a paper published by Verint Systems, entitled "The Power of Why—Using Root Cause Analysis to Drive Superior Performance," January, 2007, which is incorporated herein by reference.

Other types of systems that process large corpora of data items can be found in the field of communication interception and analysis, in which large numbers of communication sessions are intercepted, recorded and analyzed. For example, Verint System offers several systems and solutions for intercepting, filtering and analyzing wireline and wireless, cable and satellite, Internet, multimedia, and Voice over IP communication links. Details regarding these products can be found at www.verint.com/communications_interception.

The processing of data items sometimes involves clustering, i.e., grouping data items into clusters. Typically, a clustering process attempts to group the data items so that data items within a cluster are similar in a certain respect and data items in different clusters are dissimilar. Various automatic clustering processes are known in the art. Exemplary clustering methods are described by Goldszmidt and Sahami in "A Probabilistic Approach to Full-Text Document Clustering," SRI International Technical Report ITAD-433-MS-98-044, 1998; by Slonim and Tishby in "Document Clustering using Word Clusters via the Information Bottleneck Method," Proceedings of the 23$^{rd}$ Annual International ACM SIGIR Conference on Research and Development in Information Retrieval (SIGIR'00), Athens, Greece, Jul. 24-28, 2000, pages 208-215; by Pantel and Lin in "Document Clustering with Committees," Proceedings of the 25$^{th}$ Annual International ACM SIGIR Conference on Research and Development in Information Retrieval (SIGIR'02), Tampere, Finland, Aug. 11-15, 2002, pages 199-206; and by Dhillon in "Co-clustering Documents and Words using Bipartite Spectral Graph Partitioning," Proceedings of the Seventh ACM SIGKDD International Conference on Knowledge Discovery and Data Mining (KDD 2001), San Francisco, Calif., Aug. 26-29, 2001, pages 269-274, all of which are incorporated herein by reference.

As yet another example, U.S. Patent Application Publication 2004/0163035, whose disclosure is incorporated herein by reference, describes a method for processing non-deterministic text. The method utilizes non-textual differences between words, or sequences of words, in the text to provide useful information to users by resolving more than two decision options.

SUMMARY OF THE INVENTION

Embodiments of the present invention provide a computer-implemented method for processing a plurality of data items, the method including:

defining a set of one or more categories having a corresponding set of conditions that associate the data items with the categories;

accepting a sub-categorization request from a user, requesting to divide a category from among the categories into lower-level categories;

responsively to the sub-categorization request, processing the data items that are associated with the category so as to automatically suggest the lower-level categories;

presenting the automatically-suggested lower-level categories to the user and accepting direction from the user with respect to the automatically-suggested lower-level categories;

responsively to the direction, constructing a hierarchical structure representing the categories by dividing the category into the lower-level categories; and presenting output based on the hierarchical structure to the user.

In some embodiments, the categories in the hierarchical structure describe respective types of root causes that caused the data items to be included in the plurality.

In an embodiment, the method includes performing multiple iterations of accepting sub-categorization requests from the user, automatically suggesting respective sets of the lower level categories responsively to the sub-categorization requests, presenting the automatically-suggested sets of the lower-level categories to the user, and iteratively updating the hierarchical structure of the categories responsively to accepting user directions.

In another embodiment, processing the data items includes identifying textual terms in the data items and determining similarities among the data items based on the identified textual terms. In yet another embodiment, the data items include textual terms having respective confidence scores, and processing the data items includes determining similarities among the data items based on the textual terms and the confidence scores.

In still another embodiment, the data items include textual terms, and the conditions include a condition that operates on at least the textual terms of a tested data item, such that the tested data item is associated with one of the categories when the condition is fulfilled. Additionally or alternatively, the data items include textual terms, and the conditions include a condition that operates on at least the textual terms of a tested data item and produces a numerical association metric quantifying an association of the tested data item with one of the categories.

In a disclosed embodiment, dividing the category into the lower-level categories includes defining respective conditions for associating subsequent data items with the lower-level categories. Processing the data items may include automatically generating respective suggested titles for the lower-level categories.

In an embodiment, the data items include textual terms, defining the categories includes defining respective subsets of the textual terms that characterize the categories, and the method includes accepting from the user an expansion request requesting to expand a subset of the textual terms that characterizes a respective target category and, responsively to the expansion request, automatically determining one or more additional textual terms that characterize the target category and adding the additional textual terms to the subset. In some embodiments, the data items include recorded speech. Additionally or alternatively, the data items may include one of recorded sessions conducted with customers, recorded communication sessions intercepted from a communication network and textual documents.

There is additionally provided, in accordance with an embodiment of the present invention, apparatus for processing a plurality of data items, the apparatus including:

an interface, which is operative to interact with a user; and a processor, which is arranged to accept a definition of a set of one or more categories having a corresponding set of conditions that associate the data items with the categories, to accept from the user via the interface a sub-categorization request, requesting to divide a category from among the categories into lower-level categories, to process the data items that are associated with the category responsively to the sub-categorization request so as to automatically suggest the lower-level categories, to present the automatically-suggested lower-level categories to the user, to accept direction from the user with respect to the automatically-suggested lower-level categories, to construct, responsively to the direction, a hierarchical structure representing the categories by dividing the category into the lower-level categories, and to present output based on the hierarchical structure to the user via the interface.

The present invention will be more fully understood from the following detailed description of the embodiments thereof, taken together with the drawings in which:

BRIEF DESCRIPTION OF THE DRAWINGS

FIG. 4 is a flow chart that schematically illustrates a method for interactive data categorization, in accordance with an embodiment of the present invention.

DETAILED DESCRIPTION OF EMBODIMENTS

Overview

Figure 1:
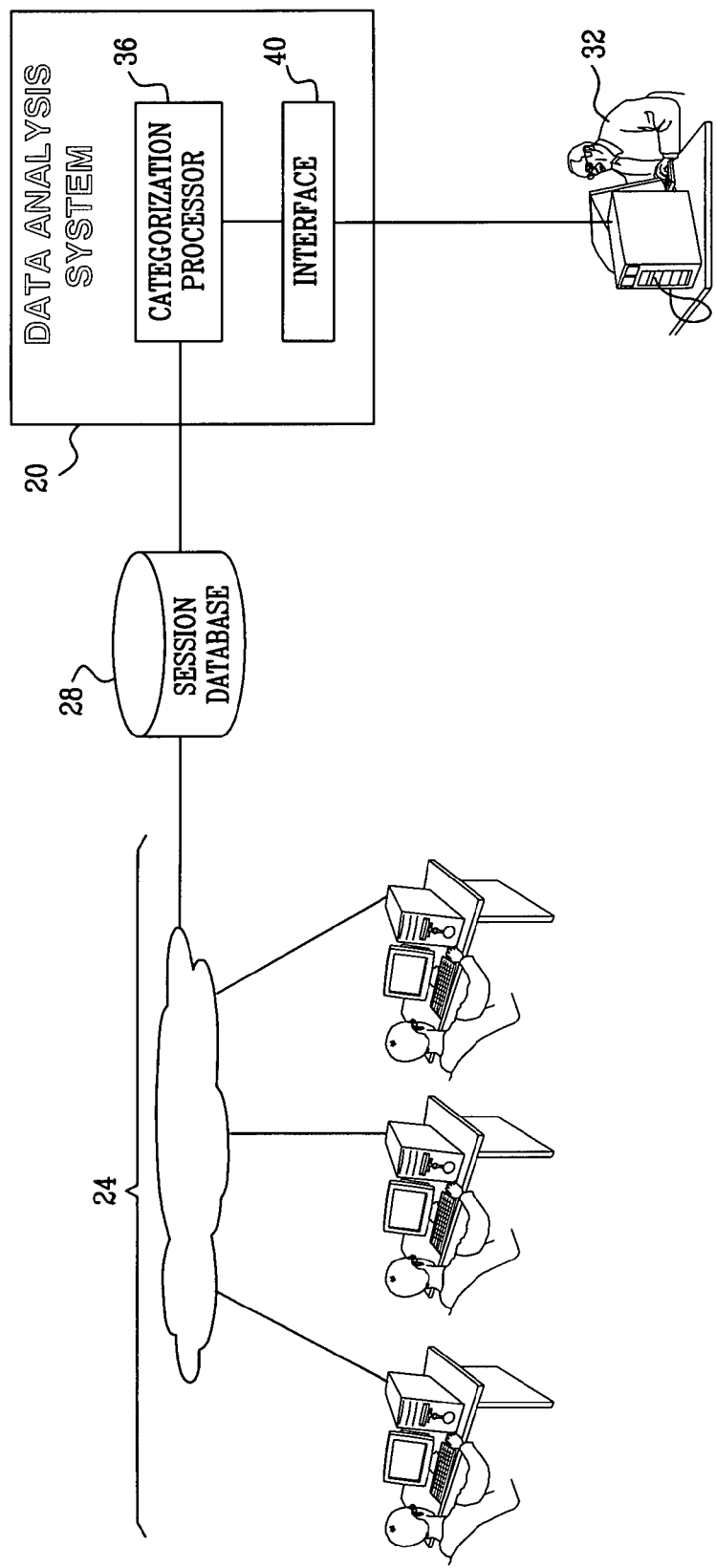
FIG. 1 is a block diagram that schematically illustrates a data analysis system, in accordance with an embodiment of the present invention.

Embodiments of the present invention provide methods and systems for categorizing collections of data items, such as customer calls that are recorded and stored by a contact center. A typical application of the categorization processes described herein is to model, study and act upon the root causes, i.e., the reasons that caused the different data items to enter the collection.

In a call center application, for example, some of the calls comprise different kinds of complaints. A customer may complain about a particular product or service, and the complaint may relate to technical aspects, cost aspects or service-related aspects, or even to a particular employee. In many cases, the root causes of complaints can be represented by a hierarchical structure of categories, such that the sub-categories at lower hierarchy levels further refine the specific features of the complaints. Several exemplary hierarchical category structures, graphically represented as trees, are described herein.

In some embodiments, a data analysis system processes a large collection of recorded customer calls. The system carries out an interactive and iterative process, which produces a hierarchical structure for categorizing the calls in the collection based on their root causes.

In a typical workflow, a user, such as an analyst, defines the applicable collection of data items and an initial set of categories. (In some cases, the user may choose to begin with a single category spanning the entire collection). The user specifies a categorization task, such as a request to expand the definition of a certain category or to sub-divide a certain category into sub-categories. The data analysis system applies a data mining process to carry out the requested categorization task and returns suggested results. For example, when requested to automatically sub-categorize a certain category, the system applies a clustering process to the data items in the category, and returns a suggested set of sub-categories.

The user reviews the suggested results and may accept, modify or reject them. The hierarchical category structure is then updated. The iterative process continues with the user requesting additional expansion and/or sub-categorization actions that invoke additional data mining tasks, until a sufficient level of categorization is reached. The interactive process outputs a hierarchical structure ("tree") of categories and sub-categories, which categorize the data items in the collection in terms of their root causes.

The interactive processes described herein combine the advantages of automatic data mining with the benefits of user review and direction, while avoiding the disadvantages of both. Automatic data mining methods, such as clustering processes, are often slow and not interactive when applied to large search spaces. The results of such processes are often not tied to any specific meaning or problem that is of interest to the user. Data mining methods are, however, able to effectively search limited search spaces and to detect relationships that are unnoticeable to the human eye. Data mining methods are often more accurate in comparison with manual search methods, since they typically traverse the search space uniformly and use objective and uniform performance metrics.

The interactive processes described herein limit the space searched by the automatic data mining process to a manageable size, so that the processing time enables interaction with the user. The user is often able to intelligently review and control the automatic process, as well as to assign meaning to the automatically-suggested results. As a result, the data analysis system is able to process large collections of data items and reach meaningful results within a reasonable processing time.

Analyzing the collection of data items using the hierarchical category structures described herein can provide the user with considerable insight and information that can be acted upon. For example, the analyst can measure the number of data items in each sub-category. A high number of complaints in a particular category can indicate a problem that was not discovered or properly isolated before. Corrective measures can be focused and prioritized in accordance with the number of complaints in each category, thus making efficient use of available resources.

Although the embodiments described herein mainly address root cause analysis, the principles of the present invention can also be used to perform other types of data categorization, such as concept discovery.

System Description

FIG. 1 is a block diagram that schematically illustrates a data analysis system 20, in accordance with an embodiment of the present invention. In the embodiments described herein, system 20 analyzes customer interaction sessions, in which customers conduct telephone conversations with a service representative of a contact center 24. In alternative embodiments, however, system 20 may process various other types of data items that originate from different types of sources or applications. For example, system 20 may process communication sessions, which were intercepted and recorded by a communication interception system.

In some embodiments, the data items processed by system 20 comprise recorded speech, in which case the content conveyed by the data items is provided to system 20 by means of a suitable speech-to-text process. Alternatively, the data items may comprise textual items, such as text documents, data files or electronic mail messages. In these embodiments, the textual content is available to system 20 without conversion. Further alternatively, the data items may be formed using any other type of communication method or medium, such as by accepting faxed documents or by scanning paper documents, which can be converted into computer-readable text.

In some cases, data items that originally comprise textual information are also subjected to a certain amount of pre-processing. For example, in a system that accepts both speech inputs and textual inputs, textual data items can be pre-processed to remove punctuation and/or capitalization in order to have both speech and textual input types yield comparable data items. Such pre-processing operations are sometimes referred to as canonization.

When the data items do not originally have a textual format, the data items stored in database 28 may have the original format (e.g., recorded speech), in which case each data item is converted to a textual format when it is retrieved. Alternatively, the data items may be converted to text and the text stored in the database. Further alternatively, in some applications the original speech is stored in database 28 along with the converted text. One or both formats may be available to the user.

In the exemplary embodiment shown in FIG. 1, customer interaction sessions, i.e., calls made by customers, are recorded by contact center 24 and stored in a session database 28. System 20 classifies at least some of the recorded calls in database 28 into a hierarchical structure of categories and sub-categories, in order to provide information as to the reasons behind the calls. The categorization process, i.e., the process of constructing the hierarchical structure of categories and sub-categories, is performed in an iterative process that combines automatic data mining methods with user review and direction, as will be explained in detail hereinbelow. In the description that follows, the terms "calls," "sessions" and "data items" are used interchangeably.

System 20 comprises a categorization processor 36, which carries out the interactive data categorization methods described herein. System 20 further comprises a user interface 40, which interacts with a user 32, such as an analyst. Interface 40 may comprise a command-line interface, graphical user interface, file interface or any other suitable user interface. Typically, processor 36 comprises a general-purpose computer, which is programmed in software to carry out the functions described herein. The software may be downloaded to the computer in electronic form, over a network, for example, or it may alternatively be supplied to the computer on tangible media, such as CD-ROM. In some embodiments, the functions of system 20 are combined with other analysis functions in an integrated data analysis system such as the Intellifind system, cited above.

Root Cause Categorization

The calls stored in database 28 may address different needs of customers and may involve different kinds of interactions. For example, some calls may be informative in nature, i.e., calls in which a customer requests information regarding a product or service. Some calls may comprise service requests, while other calls may contain different kinds of complaints. The reasons ("root causes") that caused the customers to initiate the calls may also vary from call to call.

In many cases, it is highly advantageous for an analyst to be able to categorize the calls in terms of their root causes. For example, the analyst may wish to separately address a subset of the calls that contain complaints about a specific product, a certain service or even a certain employee. The analyst may wish to differentiate between complaints that are technical in nature and complaints that are associated with pricing or service level. As yet another example, it is sometimes beneficial to give special attention to complaints made by selected premium ("VIP") customers or complaints that are associated with high value transactions.

Root causes can be represented using a hierarchical structure of categories and sub-categories, which can be graphically shown using a tree structure. Each node in the tree represents a category, and each category may have one or more sub-categories. Automated, user-assisted methods for producing such hierarchical structures are described further below.

Figure 2:
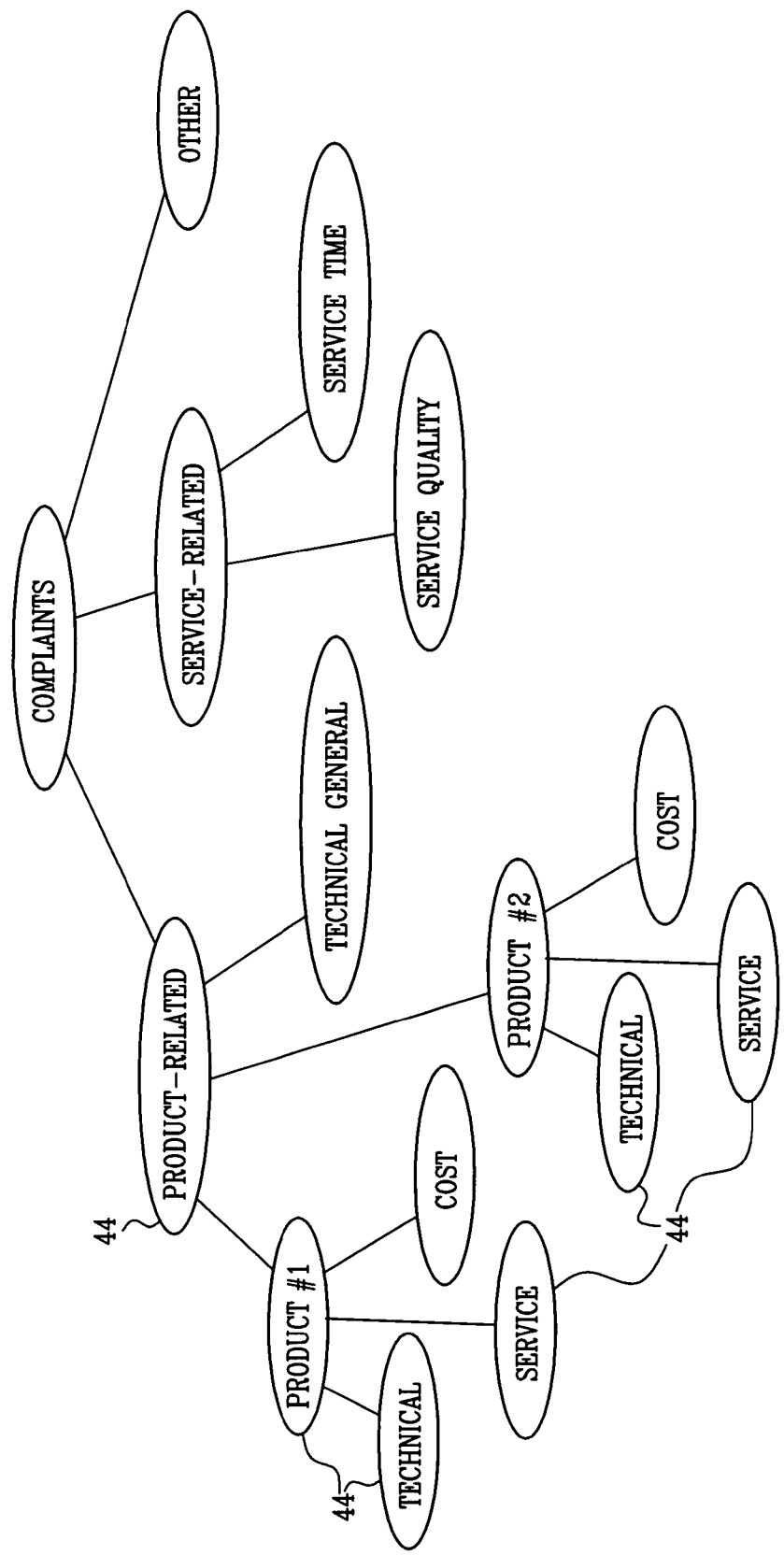
FIGS. 2 and 3 are diagrams that schematically illustrate hierarchical category structures, in accordance with embodiments of the present invention.

FIG. 2 is a diagram that schematically illustrates an exemplary tree that categorizes the different complaint-related calls in database 28 in terms of their root causes, in accordance with an embodiment of the present invention. The tree comprises nodes 44, each node representing a certain root cause category.

The highest-level category in the tree corresponds to all complaints. In the present example, complaints are categorized as product-related, service-related or other complaints. Product-related complaints may refer to a certain product (e.g., product #1 or product #2). The complaints related to a particular product can be further classified as service-related, technical-related or cost-related. Other product-related complaints may not relate to a specific product, and are categorized as "technical general." Service-related complaints may refer to service quality or to service time, and are categorized accordingly.

Once the complaint calls in database 28 are categorized, each category corresponds to a subset of the calls that comply with a certain categorization condition. Exemplary categorization conditions are described further below. Note that the mapping of calls to categories is usually not one-to-one. In other words, a certain call may correspond to more than one category or to none of the categories. Referring to the tree of FIG. 2, for example, a customer may complain about two products during the same call, or complain about the pricing, the service level as well as the product performance.

Figure 3:
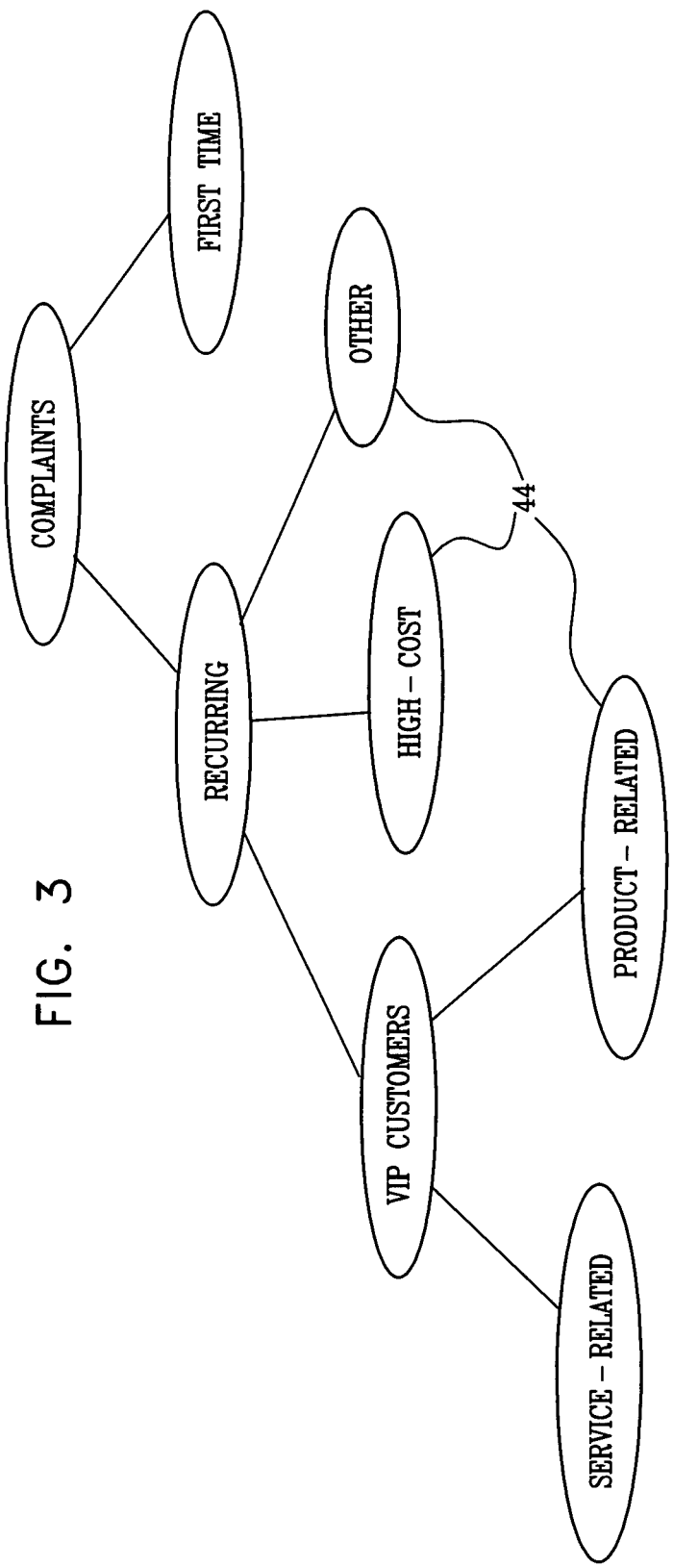

FIG. 3 is a diagram that schematically illustrates another categorization tree, in accordance with an embodiment of the present invention. In the present example, complaints are categorized as first time complaints and recurring complaints. Within the recurring complaints, complaints made by VIP customers and complaints associated with high-value transactions are assigned separate sub-categories. The VIP customer complaints are further sub-categorizes as service-related or product-related. The tree of FIG. 3 can be used to categorize the complaints in database 28 from a different angle, in comparison with the tree of FIG. 2 above.

Categorization processor 36 uses a set of categorization conditions, which operate on the data items and indicate whether, or to what extent, a certain data item is associated with a particular category. Typically, each condition corresponds to a respective category.

Categorization conditions may comprise Boolean conditions. When a Boolean condition applied to a data item evaluates to "true," the data item is regarded as belonging to the category that corresponds to the condition. When the condition evaluates to "false," the data item does not belong to the category. Other categorization conditions may define a "soft" association metric that is not binary. In other words, a categorization condition may evaluate a numerical metric that quantifies the extent to which a certain data item is associated with a certain category.

Processor 36 may use different types of Boolean and "soft" conditions, which address the content of the data items in various ways. Some conditions regard the data item as a "bag of words" (BOW), i.e., as a collection of words without specific structure. Other conditions may consider the grammatical structure of the data item, such as using various Natural Language Processing (NLP) methods known in the art.

For example, a categorization condition may be true when one or more words, phrases or expressions (collectively referred to as "terms" or "textual terms"), which are indicative of the corresponding category, appear in the data item. For example, a condition may state that a data item is categorized as a complaint if and only if one or more of the terms "complain," and "unhappy" appears in the data item. Other conditions may consider the occurrence frequency of a certain term in the data item. Yet another type of condition may be true only when a certain term does not appear in the data item.

Some conditions may define relationships between terms in the data item. For example, a certain condition may be true if the word "credit" appears in the data item, but not as part of the phrase "credit card." Another example is a proximity condition, which is true only when two terms are found in proximity to one another in the data item.

Another type of condition is based on comparing the tested data item to reference data items. In other words, a certain category can be defined using one or more reference data items, which may comprise positive or negative examples. A condition may define, for example, that a data item that is sufficiently similar to a positive reference data item is regarded as belonging to the category. Another condition may define that the tested data item should be sufficiently different from a negative reference document.

Some categorization conditions use metadata related to the data item, either instead of or in addition to considering the content of the data item. The metadata may be stored together with the data item or provided separately. For example, a complaint call may be classified as originating from a VIP customer by retrieving the customer details. This information may be stored along with the recorded call, or obtained separately, such as from an external Customer Relationship Management (CRM) system.

The conditions used by processor 36 may comprise combinations of the conditions described above. Additionally or alternatively, any other type of condition or combination of conditions can also be used to define or quantify the association of the data items to the categories. When the categories are arranged in a hierarchical structure as in FIGS. 2 and 3, the logical condition of a certain sub-category will often (although not necessarily) include the conditions of its parent category, plus one or more additional constraints.

Interactive Categorization Method

FIG. 4 is a flow chart that schematically illustrates a method for data categorization, in accordance with an embodiment of the present invention. The method of FIG. 4 is carried out by processor 36 in order to construct hierarchical category structures such as the trees shown in FIGS. 2 and 3 above, based on a collection of data items. In the exemplary contact center application shown in FIG. 1 above, each data item comprises a recorded customer call.

The method of FIG. 4 is an interactive method, in which processor 36 performs automatic categorization tasks using various data mining processes, and the user reviews, controls and directs the automatic process. The interactive process described herein combines the advantages of automatic data mining with the benefits of user review and direction, while avoiding the disadvantages of both. Automatic data mining methods, such as clustering processes, are usually slow and not interactive when applied to large search spaces. The results are often not tied to any specific meaning or problem that is of interest to the user. Data mining methods are, however, able to effectively search limited search spaces and to detect relationships that are unnoticeable to the human eye. Data mining methods are often more accurate in comparison with manual search methods, since they typically traverse the search space uniformly and use objective and uniform performance metrics.

The process described herein limits the space searched by the automatic process to a manageable size, so that the processing time enables interaction with the user. The user is often able to intelligently review and control the automatic process, as well as to assign meaning to the automatically-suggested results. As a result, system 20 is able to process large collections of data items and reach meaningful results within a reasonable processing time.

The method of FIG. 4 begins with the user defining the applicable data corpus, at a data definition step 50. For example, when the method is used for categorizing complaint calls based on root causes, the applicable data corpus may comprise a subset of the recorded calls that are classified as complaints. In some embodiments, the desired data corpus is obtained by invoking a suitable user query in a speech analytics tool, such as the Intellifind product, cited above. In some embodiments, the data items in the corpus are pre-assigned respective weights that quantify their confidence level, importance and/or relevance.

The user defines an initial set of categories using interface 40, at an initial categorization step 54. Each category is specified by means of a categorization condition, which, when operating on a certain data item, determines whether, or to what extent, the data item is associated with the category. Thus, in effect, the user inherently defines the categories by formulating the logical conditions. Referring to the example of FIG. 2 above, the user may initially define the first hierarchy level of the tree, i.e., categories for product-related, service-related and other complaints. Alternatively, the user may initially define only the top "complaints" category. In some embodiments, each category is assigned a descriptive title. The title can be assigned manually, automatically, or automatically with a possible user override.

The user now invokes processor 36 to perform an automatic categorization iteration, at a categorization requesting step 58. In some embodiments, the user can request processor 36 to broaden, or expand, the definition of a certain category (i.e., to suggest additional terms that are indicative of the category). This type of request can gain additional insight as to the content of the data items within a certain category, which may not be apparent to the user.

For example, consider a scenario in which the user requested to expand the definition of an existing category, which includes the complaint calls of customers that wish to close their accounts. The automatic expansion process found that the terms "letter" and "fax" are characteristic of the data items of the category. An investigation that followed this finding of the automatic process revealed that in order to close their accounts, the complaining customers had to interact with the contact center using fax or letter, and not by phone or e-mail, for the first time. In another exemplary scenario, automatic expansion of a certain category returned the additional terms "fee" and "twenty-five dollars." This finding was related to a new fee policy, which apparently caused much resentment among customers.

In response to a request to expand the definition of a category, processor 36 searches the stored data items and attempts to determine additional terms that are indicative of the category in question, at a category broadening step 62. Typically, the desired terms should have high positive correlation with the data items that belong to the category, and negative correlation with the data items that do not belong to the category. Several methods for automatic query expansion, i.e., for automatically adding search terms to a search query, are known in the art. Processor 36 can use any such method, or any other suitable method, for carrying out step 62. Exemplary query expansion methods are described by Qiu and Frei in "Concept Based Query Expansion," Proceedings of the 16$^{th}$ Annual International ACM SIGIR Conference on Research and Development in Information Retrieval (SIGIR'93), Pittsburgh, Pa., Jun. 27-Jul. 1, 1993, pages 160-169, which is incorporated herein by reference. When the data items are weighted, the query expansion process may consider the weights when searching for additional descriptive terms.

Additionally or alternatively, at step 58 above, the user can invoke processor 36 to automatically divide a certain category into sub-categories. Referring to the example of FIG. 2 above, assume that the first level of hierarchy is already defined, but the user cannot decide how to sub-divide the "product-related" complaint category. The user may not be able to perform this task because he or she may be inexperienced, because the category has an extremely large number of data items that is difficult to analyze manually, or for any other reason. In some cases, an automatic data mining process can be much more effective in finding similarities among groups of data items and suggesting possible sub-categories than a human analyst.

In response to a sub-categorization request, processor 36 processes the data items in the category and suggests a possible division of the category into a set of sub-categories, at a sub-categorization step 66. Typically, processor 36 applies a clustering process to the data items within the category. The clustering process attempts to divide the data items in the category into two or more clusters, such that the data items within each cluster are similar to one another and data items in different clusters are dissimilar. Any suitable similarity metric and clustering process can be used for this purpose, such as the clustering methods cited in the Background section above.

When the data items are weighted, the clustering process may take the weights into account in determining the similarities between data items. In some embodiments, the data items processed by the clustering process may comprise non-deterministic text, i.e., text that is not fully known, and whose textual terms are assigned respective confidence scores. Exemplary clustering processes that operate on non-deterministic text are described in U.S. Patent Application Publication 2004/0163035, cited above.

As noted above, the automatic clustering process may produce sub-categories that are not apparent to the user who examines the data items. The clustering process is often able to detect relationships that are not intuitive to the user, especially when the category contains a large number of data items.

Processor 36 presents the output of step 62 and/or 66 to the user using interface 40, at a suggestion presentation step 70. When asked to expand the definition of a certain category, the processor typically presents the terms it suggests to add to the category definition.

When requested to sub-categorize a certain category, processor 36 may present the suggested sub-categorization by listing the data items that belong to each suggested sub-category. Additionally or alternatively, the processor may present the similarities or terms that characterize each of the clusters. This type of output may provide more insight to the user as to the reason, or common denominator, of each cluster.

In some embodiments, processor 36 automatically assigns a suggested title to each of the suggested sub-categories. The processor can determine the title based on the common terms or other similarities discovered by the clustering process. The suggested title may contain terms selected from a predefined list. In alternative embodiments, the category titles are assigned by the user.

When presenting the suggested sub-categorization to the user, processor 36 may display the automatically-assigned title and/or a brief summary of representative sections from one or more typical data items.

In some embodiments, processor 36 presents the suggested sub-categorization but is not able to generalize the results, i.e., formulate categorization conditions that correspond to the suggested sub-categories. In these cases, the user may formulate the conditions based on the data items presented by the processor. Alternatively, the processor may be able to automatically suggest conditions that correspond to the suggested sub-categories. Subsequent data items can be associated with the sub-categories using the automatically-suggested conditions.

The user reviews the suggestions presented by processor 36 and directs the progress of the iterative process, at a user direction step 74. The user may accept, modify or reject the suggestions made by processor 36. For example, when expanding the definition of a category, the user may accept, modify and/or reject some or all of the automatically-suggested additional terms.

When sub-categorizing a certain category, the user may accept, modify or reject the results of the automatic clustering process. For example, the user may merge two suggested sub-categories into one, reject a certain sub-category, or further subdivide a certain suggested sub-category. The user may examine the suggested sub-categorization purely for the sake of gaining insight as to the structure of the category, and then force an entirely different sub-categorization or even refrain from sub-dividing the category.

In many cases, the clustering process is able to determine a distinct and clear-cut sub-categorization suggestion, but is not able to generalize and formulate the conditions that define this sub-categorization. Thus, the user may examine the clustering results and formulate conditions that correspond to the suggested sub-categorization, or modify conditions that were automatically suggested by processor 36. Further alternatively, the user can take any other suitable action with respect to the automatically-suggested sub-categorization.

The user examines the current categorization structure and checks whether the level of sub-categorization is sufficient, at a checking step 78. If the categorization level is not sufficient, the method loops back to categorization requesting step 58 above to perform another iteration of the process. The user enters another request to further refine the categorization of the data items, either by expanding the definition of a certain category or by dividing a certain category into sub-categories. Otherwise, the user terminates the method, at a termination step 82.

The interactive process of FIG. 4 produces a hierarchical structure of categories and sub-categories, such as the trees of FIGS. 2 and 3, which categorizes the data items in the applicable data corpus. Each specific categorization task is performed automatically, but the overall process is directed by the user. In extreme cases, the user can direct the process to produce entirely different hierarchical structures that view the data items from different angles. For example, the hierarchical structures shown in FIGS. 2 and 3 categorize the same collection of recorded complaint calls using two entirely different sets of criteria.

In some embodiments, the method of FIG. 4 is applied off-line, to a static collection of data items. In alternative embodiments, the method can be applied to a dynamic collection of data items that changes over time. For example, in the exemplary contact center application of FIG. 1 above, recorded calls may be added to database 28 during operation of the contact center, and old calls may be deleted from the database. The method of FIG. 4 can be applied to the dynamic database, so as to update the hierarchical categorization structure based on newly-arriving calls and/or newly-deleted calls. Off-line operation can be combined with dynamic operation. For example, the categorization process can be applied periodically or occasionally to a dynamically-changing database, with each cycle starting from the hierarchical structure produced by the previous cycle.

Analyzing the collection of data items using the hierarchical category structure produced by the method of FIG. 4 can provide the analyst with considerable insight and information. For example, the analyst can measure the number of data items in each sub-category. A high number of complaints in a particular category can isolate a problem that was not discovered or properly identified before. Corrective measures can be focused and prioritized in accordance with the number of complaints in each category, thus making efficient use of available resources.

Although the embodiments described herein mainly address user-directed automated categorization for determining the root cause of data items, the principles of the present invention can also be used for categorization processes of other kinds. For example, the methods and systems described herein can be used for concept discovery, i.e., for categorizing data items according to the subject matter to which they refer.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A computer-implemented method for processing a plurality of recorded calls, the method comprising:
   defining a set of one or more categories having a corresponding set of conditions that associate the recorded calls with the categories, wherein the recorded calls are categorized in terms of their root causes;
   in a graphical user interface, accepting a sub-categorization request sent from an analyst, requesting to divide a category from among the categories into lower-level categories;
   responsively to the sub-categorization request, processing the recorded calls that are associated with the category using a clustering process that divides the recorded calls into a plurality of clusters so as to automatically suggest the lower-level categories, wherein each of the lower-level categories is from a different one of the plurality of clusters;
   presenting the automatically-suggested lower-level categories to the analyst and accepting direction from the analyst with respect to the automatically-suggested lower-level categories;
   responsively to the direction, constructing a hierarchical structure representing the categories by dividing the category into the lower-level categories;
   presenting output based on the hierarchical structure to the analyst; and
   analyzing the recorded calls using the hierarchical structures.

2. The method according to claim 1, wherein the categories in the hierarchical structure describe respective types of root causes that caused the recorded calls to be included in the plurality.

3. The method according to claim 1, and comprising performing multiple iterations of accepting sub-categorization requests from the analyst, automatically suggesting respective sets of the lower level categories responsively to the sub-categorization requests, presenting the automatically-suggested sets of the lower-level categories to the analyst, and iteratively updating the hierarchical structure of the categories responsively to accepting analyst directions.

4. The method according to claim 1, wherein processing the recorded calls comprises identifying textual terms in the recorded calls and determining similarities among the recorded calls based on the identified textual terms.

5. The method according to claim 1, wherein the recorded calls comprise textual terms having respective confidence scores, and wherein processing the recorded calls comprises determining similarities among the recorded calls based on the textual terms and the confidence scores.

6. The method according to claim 1, wherein the recorded calls comprise textual terms, and wherein the conditions comprise a condition that operates on at least the textual terms of a tested data item, such that the tested data item is associated with one of the categories when the condition is fulfilled.

7. The method according to claim 1, wherein the recorded calls comprise textual terms, and wherein the conditions comprise a condition that operates on at least the textual terms of a tested data item and produces a numerical association metric quantifying an association of the tested data item with one of the categories.

8. The method according to claim 1, wherein dividing the category into the lower-level categories comprises defining respective conditions for associating subsequent recorded calls with the lower-level categories.

9. The method according to claim 1, wherein processing the recorded calls comprises automatically generating respective suggested titles for the lower-level categories.

10. The method according to claim 1, wherein the recorded calls comprise textual terms, wherein defining the categories comprises defining respective subsets of the textual terms that characterize the categories, and comprising accepting from the analyst an expansion request requesting to expand a subset of the textual terms that characterizes a respective target category and, responsively to the expansion request, automatically determining one or more additional textual terms that characterize the target category and adding the additional textual terms to the subset.

11. The method according to claim 1, wherein the recorded calls comprise recorded speech.

12. The method according to claim 1, wherein the recorded calls comprise one of recorded sessions conducted with customers, recorded communication sessions intercepted from a communication network and textual documents.

13. Apparatus for processing a plurality of recorded calls, the apparatus comprising:
an interface, which is operative to interact with analyst; and
a processor, which is arranged to accept a definition of a set of one or more categories having a corresponding set of conditions that associate the recorded calls with the categories, wherein the recorded calls are calls, and the calls are to be categorized in terms of their root causes, to accept from the analyst via the interface a sub-categorization request, requesting to divide a category from among the categories into lower-level categories, to process the recorded calls that are associated with the category responsively to the sub-categorization request using a clustering process that divides the recorded calls into a plurality of clusters so as to automatically suggest the lower-level categories, to present the automatically-suggested lower-level categories to the analyst, to accept direction from the analyst with respect to the automatically-suggested lower-level categories, to construct, responsively to the direction, a hierarchical structure representing the categories by dividing the category into the lower-level categories, and to present output based on the hierarchical structure to the analyst via the interface, and to analyze categories of recorded calls using the hierarchical structures;
wherein each of the lower-level categories is from a different one of the plurality of clusters.

14. The apparatus according to claim 13, wherein the categories in the hierarchical structure describe respective types of root causes that caused the recorded calls to be included in the plurality.

15. The apparatus according to claim 13, wherein the processor is arranged to perform multiple iterations of accepting sub-categorization requests from the analyst, automatically suggesting respective sets of the lower-level categories responsively to the sub-categorization requests, presenting the automatically-suggested sets of the lower-level categories to the analyst, and iteratively updating the hierarchical structure of the categories responsively to accepting analyst directions.

16. The apparatus according to claim 13, wherein the processor is arranged to identify textual terms in the recorded calls and to suggest the lower-level categories by determining similarities among the recorded calls based on the identified textual terms.

17. The apparatus according to claim 13, wherein the recorded calls comprise textual terms having respective confidence scores, and wherein the processor is arranged to suggest the lower-level categories by determining similarities among the recorded calls based on the textual terms and the confidence scores.

18. The apparatus according to claim 13, wherein the recorded calls comprise textual terms, and wherein the conditions comprise at least one condition, which operates on at least the textual terms of a tested data item and is selected from a group of condition types consisting of a Boolean condition that associates the tested data item with one of the categories when the Boolean condition is fulfilled, and a soft condition that produces a numerical association metric quantifying an association of the tested data item with the one of the categories.

19. The apparatus according to claim 13, wherein the processor is arranged to define respective conditions for associating subsequent recorded calls with the lower-level categories.

20. The apparatus according to claim 13, wherein the recorded calls comprise recorded speech.

* * * * *